Oct. 24, 1933.  H. F. FISHER  1,932,093
METHOD OF AND APPARATUS FOR RESOLVING OIL
WATER SUSPENSIONS AND LOOSE EMULSIONS
Filed July 3, 1929   2 Sheets-Sheet 1
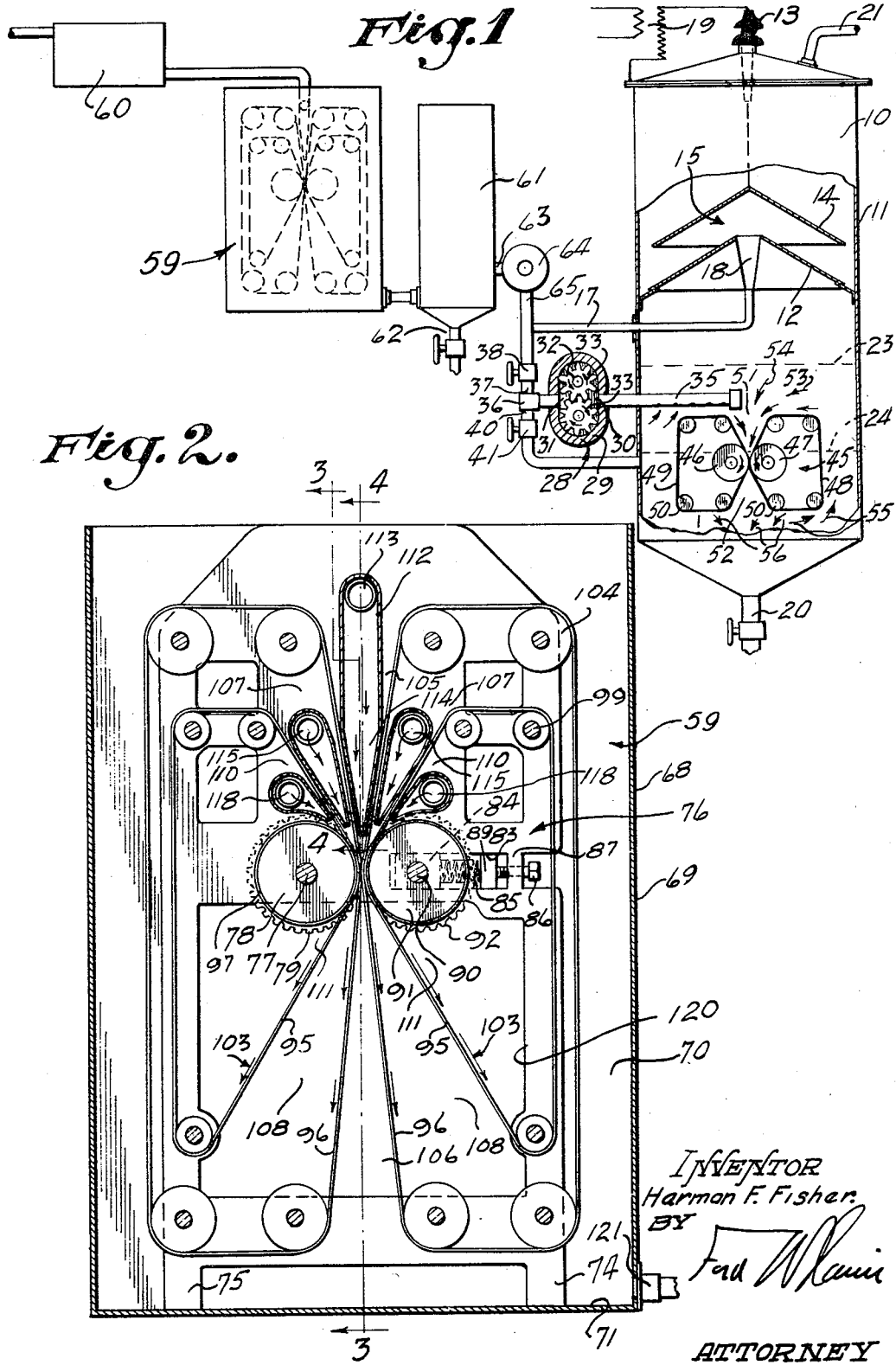
INVENTOR
Harmon F. Fisher.
BY
ATTORNEY Oct. 24, 1933.     H. F. FISHER     1,932,093
METHOD OF AND APPARATUS FOR RESOLVING OIL
WATER SUSPENSIONS AND LOOSE EMULSIONS
Filed July 3, 1929     2 Sheets-Sheet 2
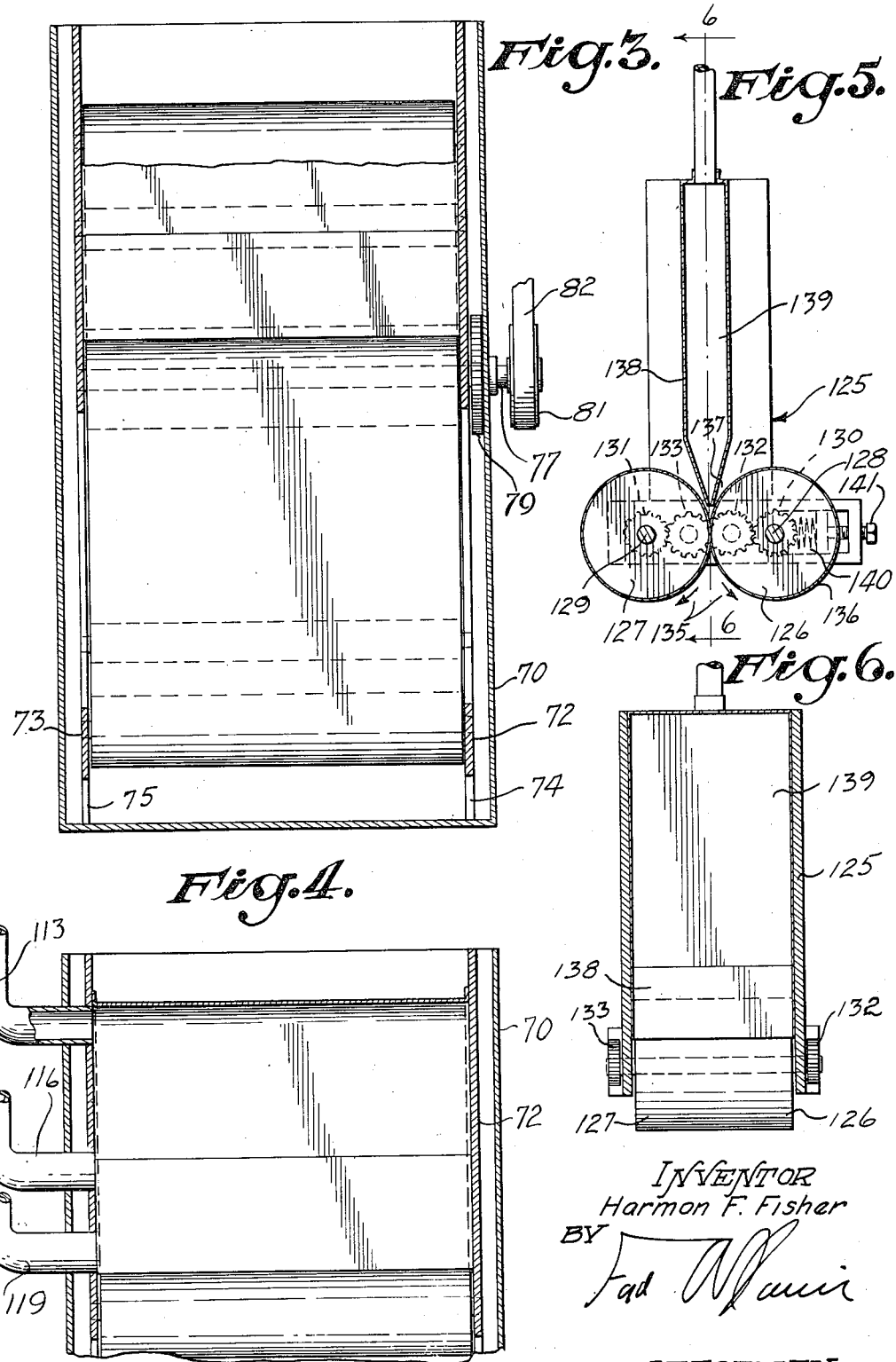
INVENTOR
Harmon F. Fisher
BY
ATTORNEY Patented Oct. 24, 1933

1,932,093

UNITED STATES PATENT OFFICE 1,932,093

METHOD OF AND APPARATUS FOR RESOLVING OIL-WATER SUSPENSIONS AND LOOSE EMULSIONS

Harmon F. Fisher, Long Beach, Calif., assignor to Petroleum Rectifying Company of California, Los Angeles, Calif., a corporation of California Application July 3, 1929. Serial No. 375,819

14 Claims. (Cl. 196—3)

My invention relates to a novel method of and apparatus for separating the phases of an emulsion.

In the oil industry, it is found that the crude oil as it comes from the well is often associated with water, the water and oil forming an emulsion. The type of emulsion formed varies, some of these emulsions being very stable and others being quite unstable. Emulsions also differ among themselves according to whether they are "tight" or "loose". A "tight" emulsion is usually very close-grained, dense, and extremely stable. Such emulsions generally offer the maximum resistance to being resolved into their component phases, and have little or no tendency to separate when left unagitated over long periods of time. A "loose" emulsion, on the other hand, when viewed in a centrifuge tube exhibits a loose, coarse-grained structure and generally shows some tendency to settle to the bottom of the container, but without any pronounced tendency to resolve itself into its component parts.

Thus, such a loose emulsion will, if left unagitated for very long periods of time, drop to the lower portion of a container allowing the dry oil to rise. The portion that settles is, however, still an emulsion of the "loose" type. Such a method of separating dry oil from emulsion is not economically feasible due to the time element involved.

It is customary to break "tight" emulsion by passing this emulsion through electric fields which agglomerate the water particles into masses of sufficient size to gravitate from the oil. This method of dehydration is well known in the art, and it is also known that in thus resolving the "tight" emulsion, a certain amount of loose flocculent emulsion may remain. Furthermore, in treating certain types of "tight" emulsion by this electrical dehydration process, the water freed therefrom is very slow in settling; often sufficiently slow to cause a decided limitation of the capacity of the treating apparatus. This slow settling of the water is found to exist independently of whether or not a loose flocculent type of emulsion such as defined above exists.

In the electrical method of dehydration under discussion, the actual separation of the phases takes place after the emulsion leaves the treating space, this settling action either taking place in the same container with the electrodes, or in a separate container. It is found in actual practice that the water and dry oil usually are separated by a layer of loose flocculent emulsion.

I have found that such loose emulsions of the type described, or suspensions of water in oil, if placed in the palm of the hand can be made to separate by rubbing, squeezing, and/or gently rolling the emulsion in somewhat the same manner as an ointment is rubbed into the skin.

This phenomenon can be explained in two ways;—first, the mechanical squeezing, rubbing or rolling action separates the oil and water, or else the separation takes place due to a selective wetting effect, the oil wetting the skin of the palm of the hand in preference to the water. Moreover, even after the skin is thoroughly wet by the oil additional loose emulsion or suspension can be made to at least partially separate by the rubbing, squeezing or rolling motion of the finger. I have found it possible to accomplish a somewhat similar action by effecting a mechanical squeezing or rolling action, especially when accompanied by a rubbing action and aided by a selective wetting action of the surfaces in contact with the emulsion.

One of the simplest devices which will thus separate the phases of a loose emulsion I have found to be an ordinary gear pump wherein two intermeshed gears are rotated, and an emulsion is drawn between the gears and discharged therefrom at a higher pressure. Such gear pumps are well known and have been utilized as pumps in other arts. I have further found by experiment that other types of pumps, such as reciprocating or centrifugal pumps, may not have as pronounced a tendency to separate the phases of a loose emulsion, and under conditions of back pressure all pumps will rather tend to further emulsify these phases.

These experiments substantiate the theory that certain types of emulsions may be separated by subjecting them to a rolling, squeezing, or rubbing action. The gear pump, and certain other devices which will be herein described, will separate the phases of the emulsion, due to this rolling, squeezing, and rubbing action which takes place therein.

It is an object of this invention to provide a method of and apparatus for separating emulsions by passing these emulsions between a pair of contacting elements.

A further object of this invention is to provide a novel method of and apparatus for separating phases of an emulsion by subjecting this emulsion to a rubbing, rolling, or squeezing action, or by simultaneously subjecting the emulsion to two or more of these actions.

A further object of this invention is to provide a novel method of and apparatus for separating phases of an emulsion by subjecting this emulsion to a rubbing, rolling, or squeezing action in contact with soft yielding bodies, one of which is preferentially oil wetted and the other is preferentially water wetted.

I have further found that by utilizing a gear pump of the class described, or a pump having an equivalent action, for circulating the liquid in a dehydrator, the looser emulsion will be broken thereby. Such a combination and process are claimed in a divisional application filed May 24, 1930, Serial No. 455,242, entitled "Apparatus for resolving loose emulsions".

I have further found that it is not necessary that the rolling elements be provided with teeth between which the emulsion is passed. A pair of rolls, preferably soft or yielding in character and turning in line or surface contact with each other, is also effective in separating the emulsion. Similarly, if two or more endless belts are so mounted as to be drawn between such a pair of rolls, emulsion introduced into the space between the endless belts will experience a de-emulsifying action. This action is increased by causing a rubbing or slipping action to take place between the contacting rolls or between the contacting belts and rolls. Any of the three types of mechanical de-emulsifiers may be used in performing my method, or other types having equivalent actions may also be used.

Such mechanical de-emulsifiers may be positioned in an ordinary settling tank such as is used for gravitational separation of the phases of an emulsion. Similarly, such a de-emulsifier may be positioned in a settling chamber at the lower portion of an ordinary electric dehydrator. It is, however, preferable to provide means for introducing the layer of loose emulsion into the de-emulsifier. This may be accomplished by placing the intake of the de-emulsifier in such a plane that this loose emulsion is drawn therethrough.

It is an object of this invention to provide a mechanical de-emulsifier which may be used in conjunction with an electric dehydrator to assist in the separation of the phases of an emulsion.

It is also possible to use such a de-emulsifier for primarily treating the emulsion before subjecting this emulsion to electric dehydration. In this instance it is preferable to pass the emulsion through the mechanical de-emulsifier, allow the emulsion to settle, and draw off that portion of the emulsion which lies at the top of the settling space, this portion being of a tight character and not completely broken by the mechanical de-emulsifier.

It is an object of this invention to provide a method of dehydrating emulsion in which the emulsion is passed through a mechanical de-emulsifier before being subjected to electric dehydration.

Further objects and advantages of this invention will be made evident hereinafter.

Referring to the drawings, in which I illustrate several embodiments of my invention,—

Fig. 1 is a diagrammatic utility view illustrating several methods of using the mechanical de-emulsifier of my invention.

Fig. 2 is a side view, partially sectioned, of my de-emulsifier.

Fig. 3 is a sectional view taken on the line 3—3 of Fig. 2.

Fig. 4 is a sectional view taken on the line 4—4 of Fig. 2.

Fig. 5 is an alternative form of my invention.

Fig. 6 is a sectional view taken on the line 6—6 of Fig. 5.

In Fig. 1, I have illustrated a dehydrator 10 having a shell 11 in which a grounded electrode 12 is positioned. Suitably supported from an insulator 13 is a live electrode 14, there being a treating space 15 between the electrodes 12 and 14. The type of electrode utilized may be of any desired form, the particular one shown being for illustrative purposes only. In the form shown, the emulsion enters an intake pipe 17 and is conducted through a cone 18 into the treating space 15 where it is subjected to the action of an electric field supplied by a transformer 19 in a well-known manner. This electric field agglomerates the particles of water into globules of sufficient size to gravitate from the oil and drop toward the lower part of the shell 11, whence they are withdrawn through a pipe 20. The dry oil, being of lighter gravity, rises to the top of the shell and may be withdrawn through a pipe 21. Ordinarily the dry oil and water are simultaneously and continuously drawn from the dehydrator 10.

I have found that the dry oil and water do not separate at a single plane of contact, but rather that frequently a considerable volume of loose emulsion exists between the bodies of dry oil and water, this volume being indicated by dotted lines 23 and 24, the line 23 indicating a surface dividing the dry oil and the loose emulsion, while the line 24 indicates a surface dividing the water and the loose emulsion.

I have found it advisable to pass this loose emulsion through a mechanical de-emulsifier which tends to separate the phases thereof, returning the already separated or agglomerated phases to the treating space 15 or to the settling space at the lower part of the shell 11.

Two types of de-emulsifiers are illustrated in Fig. 1; the first type being provided in the form of an ordinary gear pump 28 which comprises a shell 29 having an intake chamber 30 and exhaust chamber 31. Rotatably mounted in the shell 29 is a pair of intermeshed gears 32 which are rotated in the direction indicated by the arrows 33 in a manner to draw the emulsion through a pipe 35 extending into that portion of the emulsion between the dry oil and water, this pipe being perforated to allow an entrance of the emulsion. After being propelled through the shell 29 by the pair of gears 32 the emulsion is discharged into a fitting 36 which communicates by a pipe 37 with the intake pipe 17. A valve 38 is positioned in the pipe 37. Also communicating with the fitting 36 is a pipe 40 having a valve 41 therein, this pipe communicating with the lower portion of the shell 11. By this arrangement, it is possible to recirculate liquid from the interior of the shell 11 either through the treating space 15 or through the settling chamber at the lower portion of the shell, depending upon which of the valves 38 or 41 is open.

This same recirculating and de-emulsifying effect may be secured by the use of a de-emulsifier 45, which is diagrammatically shown in Fig. 1, as comprising resiliently contacting elements in the form of rolls 46 and 47, these rolls 46 and 47 being synchronously driven in opposite directions by any suitable means such as intermeshed gears rotating with the rolls 46 and 47.

Endless belts 48 and 49 extend between the rolls 46 and 47 and around rolls 50, these belts cooperating to form a throat 51 and an outlet 52.

there being a treating or squeezing space between this throat and outlet at the position wherein the belts move close to each other. When the rolls are rotated in the direction indicated by the arrows, the belts 48 and 49 move in a direction indicated by arrows 53, thus tending to draw emulsion into the throat 51, and discharge the phases of the emulsion from the outlet 52. It is preferable to so locate the de-emulsifier 45 that the fluid drawn into the throat 51 is taken from between the levels 23 and 24 as indicated by the arrows 54. After leaving the outlet 52, the dry oil rises, as indicated by the arrows 55, while the water separated from the emulsion by the de-emulsifier drops downward into the bottom of the tank, as indicated by the arrows 56.

It is not necessary, however, to position the de-emulsifier 45 as illustrated in Fig. 1, nor is it necessary that the rolls be rotated in the direction shown. In other words, the rolls might be reversed, and the wet oil introduced from a point below the rolls 46 and 47. This construction I have found to be advantageous in certain types of treaters in directing the dry oil upward towards the upper end of a tank. This construction would be advantageous for use in a tank wherein stratification between the dry oil and water takes place.

While it is possible to effect a treating action when the belt members 48 and 49 are travelling at identical surface velocities, I have found that a more effective action is made possible by causing a slight slippage between the rolls 46 and 47 and the belts. This slight degree of slippage can be readily secured by exerting a braking force on one of the rolls 50 or on one of the belt members, or it may also be secured by causing the rolls 46 and 47 to rotate at slightly different angular velocities as by having a larger number of teeth on one of the intermeshed gears driving the rolls 46 and 47 than on the other of these gears. This slippage causes a rubbing action to take place which assists the rolling and squeezing action already present.

Either type of de-emulsifier above described may also be utilized for treating the emulsion before this emulsion passes through the intake pipe 17 and into the treating space 15. In Fig. 1, I have illustrated a modified type of de-emulsifier 59 into which heated emulsion from a heater 60 passes. The de-emulsifier 59 acts to separate the phases of any loose emulsion present, and discharges the "tight" emulsion and the separated phases into a settling tank 61 where the separated water drops to the lower end of the tank and is removed through a pipe 62.

The dry oil and "tight" emulsion is pumped through a pipe 63 by a pump 64 having an outlet 65 communicating with the intake pipe 17.

The details of the type of de-emulsifier indicated by the numeral 59 are best illustrated in Figs. 2, 3, and 4.

Referring to these figures, the de-emulsifier 59 may be positioned in a tank 68 having end members 69 and side members 70 closed at the lower end by a bottom plate 71. Positioned just inside and parallel to the side members 70 are plates 72 and 73, these plates having legs 74 and 75 which rest against the bottom plate 71 in supporting relationship. The space between the plates 72 and 73 has been termed a treating space 76.

Extending across the treating space 76, and journalled in the plates 72 and 73 is a shaft 77 carrying a roll 78 extending substantially completely across the treating space 76, this shaft also carrying a gear 79 in the space between the plate 72 and the side member 70. Suitable drive means such as a pulley 81 and belt 82 may be used for rotating the shaft 77.

Formed in the plates 72 and 73 are horizontal guides 83 in each of which a block 84 is adapted to slide under the combined action of a spring 85 and an adjusting member 86 which is threaded through a bridge 87 of the plate, and journals in a compression member 89 to press the spring 85 against the block 84. Journalled in the blocks 84 is a shaft 90 on which is mounted a roll 91 and a gear 92, the teeth of this gear meshing with the teeth of the gear 79. The rolls 78 and 91 thus comprise synchronously rotating elements, the resiliency of the spring 85 tending to maintain a resilient contact between the two rolls.

A slippage, such as that above described, is very desirable in accelerating the treating action, and this slippage may be caused by forming the gears 79 and 92 with a different number of teeth, thereby causing the surfaces of the rolls 78 and 91 to exhibit a slight slippage if these rolls are of equal diameter. The same effect may be obtained by making the rolls of unequal diameter and by having the number of teeth on the gears 79 and 92 equal.

Adapted to pass between the surface of the rolls 78 and 91, and to be driven thereby, are two pairs of endless belts 95 and 96. The belts 95 are in surface contact with the periphery of the rolls 78 and 91, this periphery being preferably covered by a covering indicated by the numeral 97. Each of the belts 95 passes over three sets of rolls 99 which are rotatably secured in the treating space 76. These rolls are positioned as best indicated in Fig. 2, so that when driven by the rolls 78 and 91 in a direction indicated by arrows 103 these belts 95 will move toward each other before passing between the rolls 78 and 91, and will diverge from each other after passing therethrough in a manner similar to that described in the de-emulsifier 45.

The belts 96 are in surface contact with each other and with the belts 95 at a horizontal plane including the axis of the shafts 77 and 90, these belts 96 passing over rolls 104 rotatably mounted so as to extend across the treating space 76.

The arrangement of the belts, as indicated in Fig. 2, is particularly advantageous, inasmuch as the belts 96 cooperates to form a throat 105 and an outlet 106, while each of these belts cooperates with the adjacent belts 95 to provide throats 107 and outlets 108. Similarly, the belts 95 cooperate with the coverings 97 of the rolls in providing throats 110 and outlets 111.

Extending into the throat 105 is an intake structure 112 which communicates with an intake pipe 113. The intake structure 112 guides the emulsion downward and discharges it from a nozzle portion 114 formed at the lower end thereof, this nozzle portion being directed into the apex of the throat 105 so that the emulsion discharged therefrom will experience a rubbing, squeezing, and rolling action before being discharged into the outlet 106. A pair of similar intake structures 115 is provided in the throats 107 in a manner to discharge emulsion passing through intake pipes 116 into the apex of the throats 107 so that this emulsion passes between the belts 95 and 96 and is subjected to the action previously described. So also, a pair of intake members 118 is provided in the throats 110 to discharge emulsion between the belts 95 and the covers 97, this emulsion reaching the intake structure 118 through intake pipes 119.

After passing between the rolls 78 and 91, the broken or partially broken emulsion moves downward, and may escape from the treating chamber 76 through openings 120 formed in the plates 72 and 73 whence they pass through a pipe 121 which communicates with the settling tank 61. This type of de-emulsifier may be operated completely or partially submerged, and has a high capacity.

In all of the forms of the invention above described I have found it desirable to pass the emulsion between the surfaces of different characteristics, one of these surfaces being preferentially oil wetted and the other being preferentially water wetted. Thus, the belt member 48 may be preferentially oil wetted, while the belt member 49 may be preferentially water wetted. Similarly, alternate belt members in the form of the invention shown in Fig. 2 may be made of these two materials. Various materials may be utilized for this purpose, but the water wetted materials which I prefer to use are linen terry or canvas made of linen. Similarly, the preferred oil wetted materials are wool felt, cotton terry, or canvas made of cotton. By making one of the surfaces contacted by the emulsion preferentially oil wetted and the other preferentially water wetted I have found that a maximum resolving effect is obtained.

Still another form of de-emulsifier is illustrated in Figs. 5 and 6, this de-emulsifier being indicated by the numeral 125 and having contact elements in the form of rolls 126 and 127 respectively mounted on shafts 128 and 129. On these shafts are mounted gears 130 and 131 meshing respectively with gears 132 and 133, the latter two gears being intermeshed. Any one of the gears may be utilized as a driver to turn the rolls in a direction indicated by arrows 135.

Each of the rolls 126 and 127 is covered with a covering 136, one of these coverings being formed of a preferentially water wetted material and the other being formed of a preferentially oil wetted material, as above described. The coverings 136 of the rolls may be termed "belt members", inasmuch as these coverings serve the same purpose as the endless belts previously described in defining a throat 137 into which a nozzle 138 of an intake structure 139 discharges. However, in describing these coverings as being of canvas or of felt, I do not limit myself to these materials only. The materials I find to be most effective and the manner of their use are those which are definitely preferentially water wetted, such as linen terry and canvas made of linen, alternately used with materials definitely preferentially oil wetted, such as cotton terry and canvas made of cotton; wool felt also is preferentially oil wetted. Thus, by making alternate belts of one material and the others in between of the other kind of materials I find I obtain a maximum resolving effect on many emulsions.

The emulsion discharged from the nozzle 138 is drawn between the rolls and subjected to the peculiar action previously described. It is preferable to resiliently mount the shaft 128 by a spring 140 and an adjusting member 141, as previously described, so that the resilient contacting force between the rolls may be readily varied.

It should be understood that the types of de-emulsifiers indicated by the numerals 59 and 125 may be substituted for either the type 28 or type 45 illustrated in Fig. 1.

It should be understood that other types of apparatus might also be used for accomplishing the separation of the phases of a loose emulsion, whether these types include a combination of rolling, rubbing and squeezing actions, or whether they utilize these actions independently.

I claim as my invention:

1. A method of breaking an emulsion, which includes the step of: passing said emulsion between two relatively moving bodies, one being preferentially wetted by one phase of the emulsion and the other preferentially wetted by the other phase of the emulsion.

2. The method of breaking a water in petroleum emulsion, a portion of which is a loose flocculent emulsion and a portion of which is a tight emulsion, which comprises subjecting said emulsion to a squeezing and rolling action without substantial rubbing action to resolve the loose flocculent portion of the emulsion, separating the treated loose flocculent emulsion from remainder of said emulsion and thereafter breaking the tight emulsion.

3. In a device for breaking emulsions, the combination of: a pair of contacting bodies; and means for rotating said bodies in opposite directions in a manner to draw emulsion therebetween.

4. In a device for breaking emulsions, the combination of: a pair of bodies normally in contact with each other and forming a throat; means for introducing an emulsion between said bodies and into said throat; and means for moving each of said bodies at substantially constant differential surface velocities, said velocities being in the same direction at the point of contact and in such direction that the movement of each body tends to draw said emulsion into said throat and between said bodies.

5. In a device for breaking emulsions, the combination of: a pair of rolls having parallel axes of rotation and disposed so that the surfaces thereof are adjacent; means for driving said rolls; a belt member extending between said rolls; and means for introducing emulsion between one of said rolls and said belt member.

6. In a device for breaking emulsions, the combination of: a pair of rolls having parallel axes of rotation and disposed so that the surfaces thereof are adjacent; means for driving said rolls; belt members extending between said rolls; means for introducing emulsion between said belt members; and means for driving said rolls and said belt members.

7. In a device for breaking emulsions, the combination of: a pair of rolls having parallel axes of rotation and disposed so that the surfaces thereof are adjacent; means for driving said rolls; belt members extending between said rolls, one of said belt members being formed of a material which is preferentially water wetted and the other of said belt members being formed of a material which is preferentially oil wetted; means for introducing emulsion between said belt members; and means for driving said rolls and said belt members.

8. In a device for breaking emulsions, the combination of: a pair of rolls having parallel axes of rotation and disposed so that the surfaces thereof are adjacent; means for driving said rolls; belt members extending between said rolls; means for introducing emulsion between said belt members; and means for driving said belt members at differential velocities.

9. In a device for breaking emulsions, the combination of: a pair of rolls having parallel axes of rotation and disposed so that the surfaces thereof are adjacent; means for driving said rolls; belt members extending between said rolls; means for introducing emulsion between said belt members; means for driving said rolls and said belt members; and means for moving one of said rolls relative to the other to vary the pressure between said belt members.

10. In a device for breaking emulsions, the combination of: a pair of bodies; means for moving each body so that said bodies approach each other at one section to form a throat and separate from each other at another section to form an outlet and so that the surface velocities of the bodies are substantially the same, said bodies approaching each other close enough between said throat and said outlet to agglomerate the dispersed phase of an emulsion; and means for supplying an emulsion to said throat.

11. In a device for breaking emulsions, the combination of: a tank means containing a body of liquid; a pair of bodies in said tank, both of said bodies being situated at least partially below the surface of said body of liquid; means for movably mounting said bodies to define a throat, a squeezing space, and an outlet; and means for moving both of said bodies whereby a portion of said liquid is drawn into said throat, said liquid being squeezed in said squeezing space and discharged into said outlet.

12. A combination as defined in claim 10 including means for resiliently forcing said bodies toward each other.

13. In a device for breaking a loose flocculent emulsion, the combination of: a primary body formed of a material preferentially wetted by one phase of the emulsion; a secondary body formed of a material preferentially wetted by the other phase of said emulsion; and means for effecting a relative movement of said bodies in close proximity to each other to draw emulsion therebetween.

14. In a device for breaking an emulsion, the combination of a pair of bodies, one of said bodies being preferentially wetted by one phase of said emulsion, means for moving each body whereby said bodies approach each other at one section to form a throat and separate from each other at another section to form an outlet, said bodies approaching each other close enough between said throat and said outlet to agglomerate the dispersed phase of said emulsion, and means for supplying said emulsion to said throat.

HARMON F. FISHER.